US008565225B2

(12) United States Patent
Rosen

(10) Patent No.: US 8,565,225 B2
(45) Date of Patent: *Oct. 22, 2013

(54) METHOD AND SYSTEM FOR PROVIDING VOIP SERVICES

(76) Inventor: Michael Rosen, Akron, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 13/482,661

(22) Filed: May 29, 2012

(65) Prior Publication Data
US 2012/0236848 A1    Sep. 20, 2012

Related U.S. Application Data

(63) Continuation of application No. 11/863,326, filed on Sep. 28, 2007, now Pat. No. 8,228,907.

(60) Provisional application No. 60/827,533, filed on Sep. 29, 2006.

(51) Int. Cl.
H04L 12/66    (2006.01)
H04L 12/28    (2006.01)
H04M 3/42     (2006.01)

(52) U.S. Cl.
USPC .. 370/356; 370/401; 379/211.02; 379/212.01

(58) Field of Classification Search
None
See application file for complete search history.

(56) References Cited

U.S. PATENT DOCUMENTS

| | | | |
|---|---|---|---|
| 5,905,782 A * | 5/1999 | Lee et al. | 379/100.01 |
| 7,050,426 B2 | 5/2006 | Veschi | |
| 7,386,111 B2 | 6/2008 | Holder | |
| 7,680,262 B2 | 3/2010 | Holder | |
| 8,194,843 B2 | 6/2012 | Langos | |
| 8,213,594 B2 | 7/2012 | Holder | |
| 8,223,720 B1 | 7/2012 | Efrati et al. | |
| 2001/0012343 A1* | 8/2001 | Dal Molin | 379/100.12 |
| 2002/0169584 A1* | 11/2002 | Fu et al. | 702/188 |
| 2007/0133521 A1* | 6/2007 | McMaster | 370/352 |
| 2007/0202927 A1* | 8/2007 | Pfleging et al. | 455/567 |
| 2009/0175262 A1* | 7/2009 | Ryan | 370/352 |

* cited by examiner

Primary Examiner — Melanie Jagannathan
(74) Attorney, Agent, or Firm — Christopher L. Parmelee; Walker & Jocke

(57) ABSTRACT

A VOIP service and method is provided which comprises an redirecting dialer device (RDD), which connects a telephone to a POTS circuit. Responsive to DTMF signals from the telephone representative of a long telephone distance number, the RDD intercept the DTMF signals and transits alternative DTMF signals representative of an alternative telephone number of a PSTN/VOIP gateway server. Once connected to the PSTN/VOIP gateway server, the RDD then transmits the DTMF signals associated with the original long distance number. The VOIP gateway server is operative to convert the analog signals from the telephone into digital and packetized VOIP data which is transmitted through a public or private IP-based network to a remote telecommunication device associated with the original long distance telephone number. If the DTMF signals from the telephone are representative of a local telephone number, the RDD is operative to forgo transmitting the alternative DTMF signals.

11 Claims, 2 Drawing Sheets

METHOD AND SYSTEM FOR PROVIDING VOIP SERVICES

TECHNICAL FIELD

This invention relates to a method and system for providing voice over Internet protocol (VOIP) services. Specifically, this invention relates to a method and system for increasing the accessibility of VOIP services.

BACKGROUND ART

Telephone communication (telecommunications) has been around for over 100 years. In general the telecommunications industry has been broadly based on analog telephone services which use a public switched telephone network (PSTN) to provide phone call connections between different analog telecommunication devices. Telecommunication providers connect their customer's calls by employing equipment that monitors dual tone multi-frequency (DTMF) signals (or tones) transmitted from customers' analog dialing device over a plain old telephone service (POTS) circuit. These tones are decoded by the equipment in the telecommunication provider's office, to determine the telephone number to which the call is to be made. The equipment then typically attempts to connect the call through traditional circuit transmission of the PSTN to the POTS circuit associated with the determined telephone number.

Although analog telephone services still dominate the industry, individuals are beginning to replace their analog telephone services with newer technologies such as voice over Internet protocol (VOIP) services (also called Internet telephony, IP telephony and Voice over Internet). VOIP services provide a method of making digital and packetized phone calls over an IP-based network. The VOIP services are typically marketed to households or businesses that already pay for a broadband Internet connection (e.g., through Cable, DSL, T1). VOIP capable phones typically include a wired or wireless Ethernet connection which connects the VOIP phone to an IP-based network that has access to the broadband Internet connection. Also personal computers may be adapted to include a headset and appropriate software for making and receiving VOIP phone calls over the broadband Internet connection. In other embodiments, a VOIP analog telephony adapter (ATA) may be used to make and receive VOIP phone calls over a broadband Internet connection. Such VOIP ATAs typically have: a RJ-11 port for connecting an analog phone; and an Ethernet port for connecting the ATA to a broadband Internet connection. The VOIP ATA includes the necessary circuitry to encode/decode analog voice communications associated with the analog phone to/from packetized VOIP data transmitted through the broadband Internet connection. As used herein, whether in the form of a VOIP phone, a VOIP configured computer or an analog phone connected to a VOIP ATA, such devices or combination of devices which are capable of establishing and receiving VOIP phone calls over an Internet connection are referred to herein as VOIP client devices.

VOIP services may offer free or at least relatively inexpensive local and long distance telephone services to homes and business that have acquired a broadband Internet connection. However, not all homes and business have access to a broadband Internet connection. If such homes and business are located in a rural location, cable or DSL Internet access may not be available. Thus homes and business located in rural areas without broadband Internet access are unable to acquire VOIP services to make phone calls. In addition, even homes and business which do have the ability to acquire a broadband Internet connection, may find that the total cost of the broadband Internet access and the cost of a VOIP service may not be cost effective with respect to an analog telephone service. Thus there exists a need for a system and method which enables VOIP services to be more widely available and/or more cost effective to employ.

DISCLOSURE OF INVENTION

It is an object of an exemplary embodiment to provide a method and system for providing voice over Internet protocol (VOIP) service.

It is a further object of an exemplary embodiment to provide a method and system which enables VOIP services to be more widely available and/or more cost effective to employ.

Further objects of exemplary embodiments will be made apparent in the following Best Modes For Carrying Out Invention and the appended claims.

The foregoing objects may be accomplished in an exemplary embodiment by a VOIP system and method capable of establishing a phone call made with an analog telecommunication device such as an analog phone through a VOIP service without using a broadband Internet connection and/or an ATA. In the exemplary embodiment a VOIP call is initiated by first establishing an analog based call through a public switched telephone network (PSTN) with the system. In an exemplary embodiment, the system is operative to convert the analog based call into packetized VOIP data that is transmitted through an IP network. The system may be operative to terminate the call with a VOIP client such as a VOIP phone on a VOIP network. Also after transmission through a VOIP network, the system may be operative to reconvert the VOIP data back into an analog signal which is terminated with another analog phone of another PSTN.

In this described exemplary embodiment, the initial analog call is made to a phone number associated with the system. Once an analog phone connection is established with the system, dual tone multi-frequency (DTMF) signals representative of the desired phone number the user wishes to call are transmitted to the system. The system is responsive to these DTMF signals to determine an IP based address which can be used to transmit the call through the VOIP network to the remote telecommunication device associated with the desired number.

An exemplary embodiment comprises using a redirecting dialer device (RDD) connected between an analog telecommunication device and a POTS circuit of a PSTN. The RDD is operative to intercept and monitor first DTMF signals representative of a first telephone number from the analog telecommunication device. The RDD is operative responsive to at least a portion of the first DTMF signals to determine whether alternative DTMF signals representative of an alternative telephone number should be transmitted. In this described exemplary embodiment, the alternative telephone number is associated with a PSTN/VOIP gateway server.

Typically, the RDD determines that the alternative DTMF signals should be transmitted when it detects DTMF signals representative of a long distance telephone number. For example, initial DTMF signals representative of the numeric numbers "1" or "011" may trigger this determination. Once the RDD determines that the alternative DTMF signals should be transmitted, the RDD transmits the alternative DTMF signals through the POTS circuit to establish analog telephone communications through a PSTN with the PSTN/VOIP gateway server associated with the alternative telephone number. Once the call is established with the PSTN/

VOIP gateway server, the RDD is operative to transmit the first DTMF signals to the PSTN/VOIP gateway server through the PSTN.

The PSTN/VOIP gateway server is responsive to these first DTMF signals to establish telephone communications between the analog telecommunication device and a remote telecommunication device associated with the first telephone number. This process includes the PSTN/VOIP gateway server converting the analog telecommunications from the analog telecommunication device into digital VOIP data which is transmitted through an IP-based network. When the RDD does not detect DTMF signals representative of a long distance number, the RDD is operative to forgo transmitting the alternative DTMF signals. Instead, the RDD transmits the first DTMF signals which establishes a local phone call through the PSTN to the remote telecommunication device associated with the first telephone number.

It is to be understood that although the described RDD may be used to coordinate the interception and submission of the alternative and first DTMF signals, in alternative exemplary embodiments a user may manually perform the above described steps. For example, a user could manually use an analog phone to establish an analog phone call with the phone number of the VOIP service (e.g. the number associated with the PSTN/VOIP gateway server) and then manually key in the appropriate numbers on the analog phone to send to the PSTN/VOIP gateway server corresponding DTMF signals representative of the desired number to call.

In an exemplary embodiment, the PSTN/VOIP gateway server of the VOIP service may be in networked communication with a VOIP server (e.g. VOIP proxy server, registrar) operative to direct the VOIP data from the PSTN/VOIP gateway server to the remote telecommunication device. Such remote telecommunication devices may include VOIP client devices such as a PC, VOIP phone, an analog phone connected via an analog telephony adapter (ATA), or any other network device that is operative to connect to a broadband network connection to make and receive VOIP phone calls. In addition, the remote telecommunication devices may include an analog telecommunication device such as an analog phone connected to a PSTN network. In such cases, the VOIP server may direct the VOIP data through the IP-based network to another PSTN/VOIP gateway server which is operative to establish the call with the remote analog phone.

Although the VOIP server has been described as being used with a PSTN/VOIP gateway server to direct VOIP calls that originate from an analog phone, it is too be understood that a VOIP server may also be used to direct VOIP data that is transmitted between VOIP client devices in operative connection with the IP-based network without going through a PSTN/VOIP gateway server.

In exemplary embodiments, the PSTN/VOIP gateway server is operative to determine identifying data associated with the analog telecommunications originating from the calling analog telecommunication device. The PSTN/VOIP gateway server is operative to determine whether the identifying data corresponds to a customer account that is permitted to access the PSTN/VOIP gateway server. Such identifying data may correspond to caller ID data that identifies the telephone number associated with the POTS circuit through which the analog telecommunications is delivered. Such identifying data may also include an account number and/or password transmitted by the RDD to the PSTN/VOIP gateway server in the form of DTMF signals. Alternative exemplary embodiments of the RDD may also be operative to generate DTMF signals which include an encrypted form of the identifying data. The PSTN/VOIP gateway server may be operative to cause the identifying data to be decrypted before it is used to authorize the call. Authorization of the call may be performed by the PSTN/VOIP gateway server and/or may be carried out through communication with an authentication server or other device operative to authorize access to the system responsive to the identifying data.

As will be appreciated, the foregoing objects and examples are exemplary and embodiments need not meet all or any of the foregoing objects, and need not include all or any of the exemplary features described herein. Additional aspects and embodiments within the scope of the claims will be devised by those having skill in the art based on the teachings set forth herein.

BEST MODES FOR CARRYING OUT INVENTION

Figure 1:
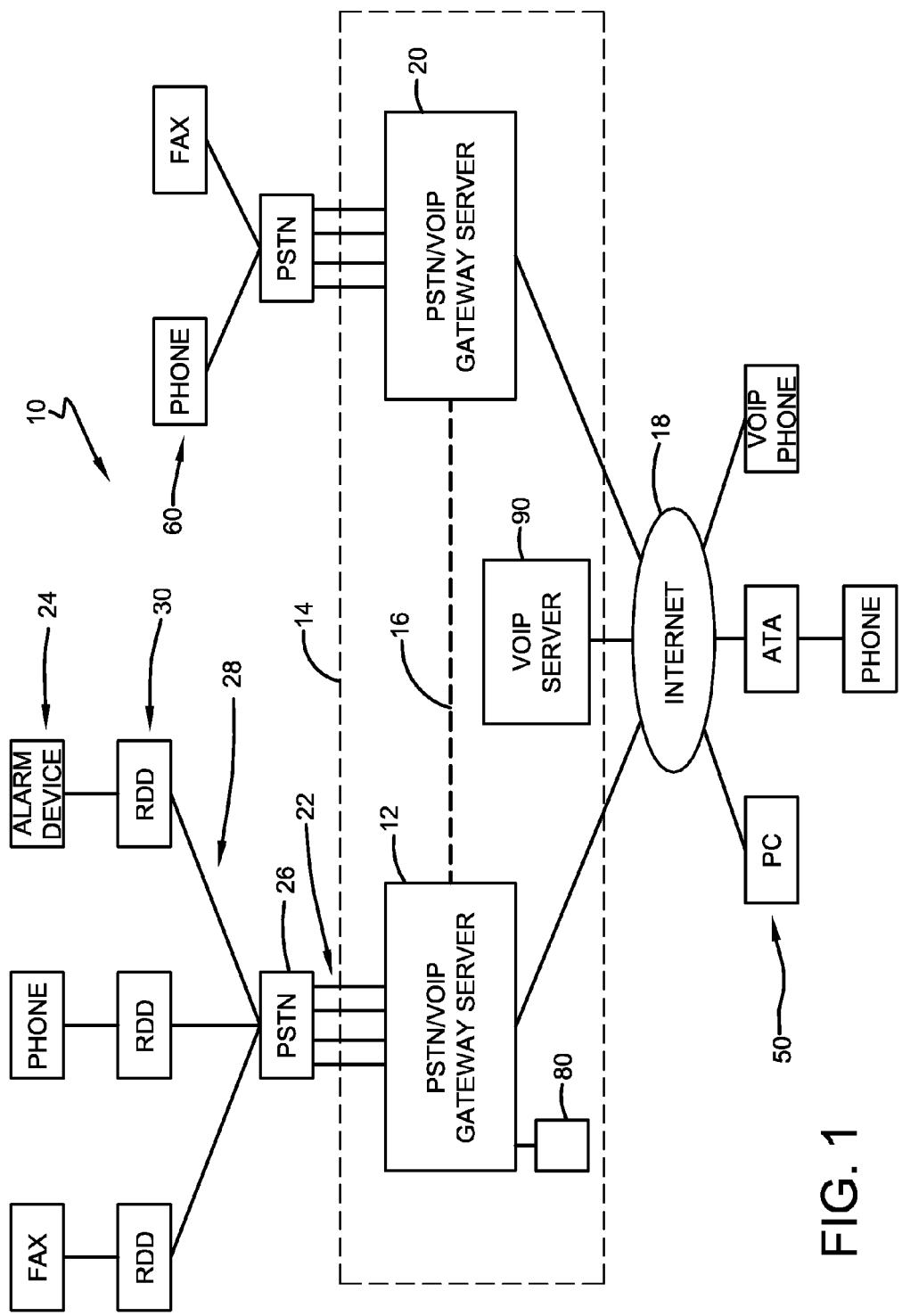
FIG. 1 is a schematic view of an exemplary embodiment of a system for providing VOIP services.

Referring now to the drawings and particularly to FIG. 1, there is shown therein a schematic view of an exemplary embodiment of a system 10 for providing voice over Internet protocol (VOIP) services to customers in a manner which does not require the customer to use and/or have a broadband Internet connection. The system is comprised of at least one PSTN/VOIP gateway server 12. The PSTN/VOIP gateway server is in operative connection with a plurality of analog telephone lines 22 of a public switched telephone network (PSTN) 26. Such PSTN analog lines may include trunk lines associated with direct inbound dialing (DID) numbers and/or access numbers provided by a telecommunication company operating portions of the PSTN. The PSTN/VOIP gateway server 12 is operative to receive through the PSTN analog lines a plurality of analog telephone calls originating from analog telecommunication devices 24 through at least one PSTN 26. Such analog telecommunication devices 24 may include analog telephones, facsimile machines, telephony capable alarm systems, or any other analog telecommunication device that is operative to connect to a plain old telephone service (POTS) circuit 28 of a local telecommunication company and make telephone calls through a PSTN.

The PSTN/VOIP gateway server 12 comprises one or more gateway servers or gateway devices capable of converting the analog signals in each analog-based call received through the PSTN analog lines into digital and packetized VOIP data which is transmitted through an Ethernet network connection or other IP-compatible network connection of the PSTN/VOIP gateway server. As used herein, VOIP data corresponds to data that conforms to a VOIP protocol such as H.323 and session initiation protocol (SIP) or any other VOIP protocol that is suitable for transmission through a private IP network 16 or a public IP network such as the Internet 18. In addition the underlying voice/sound information in the VOIP data may be appropriately compressed/decompressed using codecs compatible with the VOIP protocols and systems.

Such VOIP data may be transmitted through the IP-based network to remote VOIP client devices 50 also connected to the IP-based network. As discussed previously, such VOIP client devices 50 correspond to devices with network connections operative to connect with a broadband Internet connection device to send and receive VOIP communications through the Internet. Examples of VOIP client devices include: personal computers with VOIP software; VOIP phones with built in wired or wireless Ethernet connections; and analog telephones attached to VOIP analog telephony adapter (ATA) with an Ethernet port.

As is also known in the art, VOIP data may be transmitted through the IP-based network to another PSTN/VOIP gateway 20 which is operative to convert the packetized VOIP data back into analog signals for termination through a PSTN with a remote analog telecommunication device 60.

In this described exemplary embodiment, the operation of the one or more PSTN/VOIP gateway servers is carried out as part of a VOIP service. Such a VOIP service may also include other software operating on the PSTN/VOIP gateway server or other computer systems operative to: route VOIP data, locate network addresses of VOIP devices, monitor call usage; authenticate users, bill customers; provide a web or telephony based user interface for configuration of customer accounts; and carry out any other telecommunication or business process operative to run the VOIP service. For example, as shown in FIG. 1, the VOIP service may include additional VOIP servers 90 such as VOIP proxy servers operative to direct VOIP data across the Internet.

In this described exemplary embodiment, the users operating the analog telecommunication devices (24) are customers of the VOIP service. Such customers pay a subscription fee on a time based and/or usage based plan which permits them to call through their analog telecommunication devices (24) through a PSTN to one or more VOIP service telephone numbers associated with at least one PSTN/VOIP gateway server of the VOIP service.

Thus in this described exemplary embodiment, customers of this described VOIP service must also have the ability to make analog calls through a PSTN. Thus a typical customer will also have a PSTN based telephone calling service through a local PSTN telecommunication company.

To minimize the fees incurred with using the PSTN telephone service to call the described VOIP service, in exemplary embodiments, the VOIP service telephone numbers may include a plurality of different local calling numbers for different geographical areas in which customers of the VOIP service are located. Such local VOIP service numbers enable customers to call a local number which minimizes their fees for accessing the VOIP service. In addition, one or more of the VOIP service telephone numbers may include a toll free number. Such VOIP service telephone numbers may be connected to the PSTN/VOIP gateway server using DID numbers acquired from one or more telecommunication companies. A description of exemplary methods for acquiring DID numbers for use with exemplary embodiments, is described in more detail below.

Figure 2:
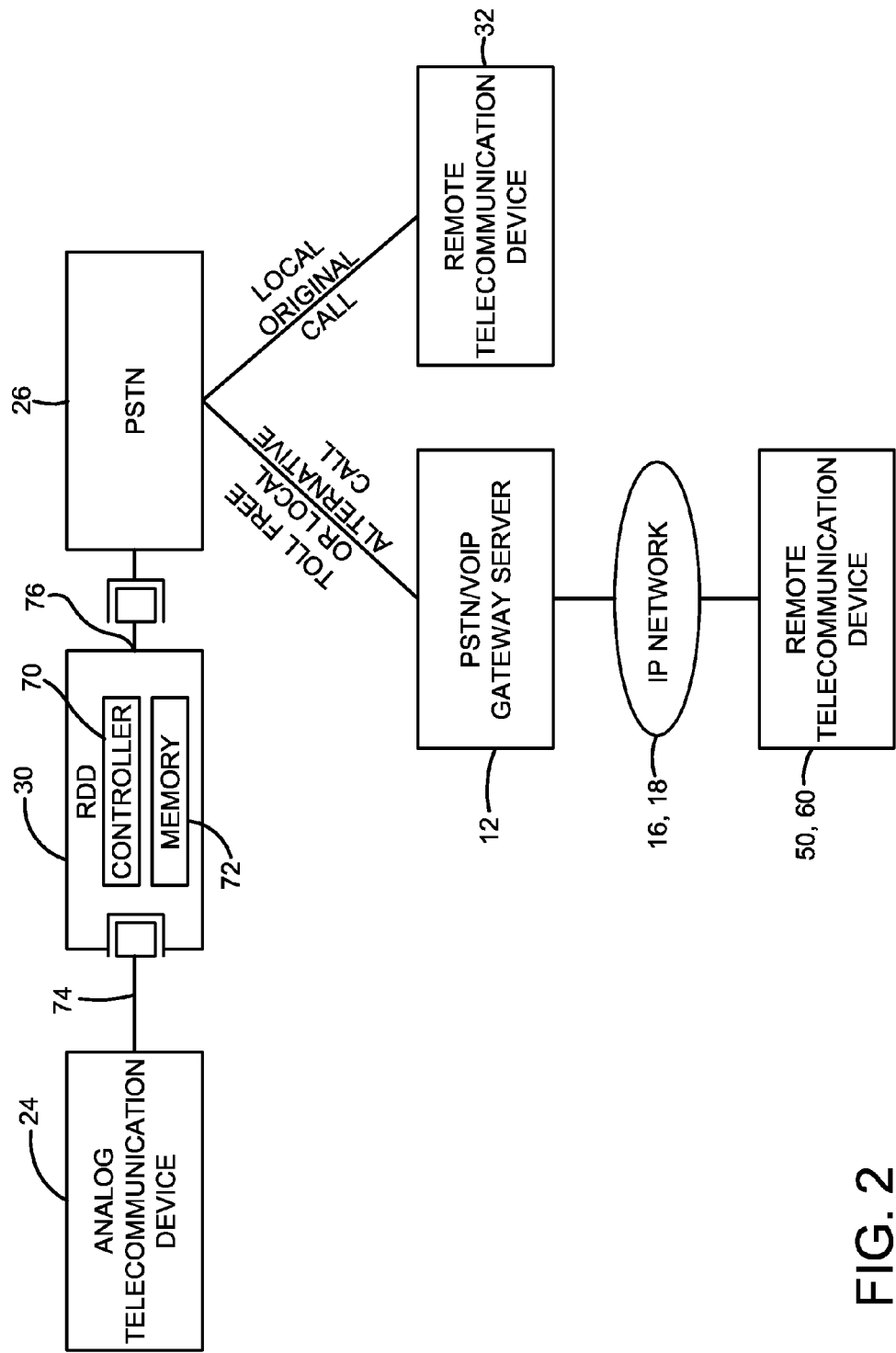
FIG. 2 is a schematic view of the operation of a redirecting dialer device used in an exemplary embodiment of the system for providing VOIP services.

In the exemplary embodiment, customers of the described VOIP service will typically only use the VOIP service when making long distance calls. Local calls can be made through their local PSTN service. As shown in FIG. 2, to automate the process of connecting long distance calls through the described VOIP service and local calls through a PSTN service, the exemplary embodiment includes placing a redirecting dialing device (RDD) 30 between the analog telecommunication device 24 (e.g., phone, fax, alarm system) of the customer and the analog telephone line (POTS circuit) connected to the PSTN 26 of the local telecommunication company.

In an exemplary embodiment, the RDD may be in the form of an adapter with a RJ-11 port 74 for inserting an RJ-11 phone line jack of an analog telecommunication device such as an analog telephone or other analog telephony device. The adapter may also include a line 76 or other connecter with a RJ-11 jack operative to be inserted into a wall mounted RJ-11 port or other telephone port to connect to the POTS circuit connected to a PSTN. In alternative exemplary embodiments the RDD may have other connectors and forms suitable to connect one or more analog telecommunication devices to a POTS circuit connected to a PSTN.

In an exemplary embodiment, the RDD may include a controller 70 adapted to monitor dual tone multi-frequency DTMF signals generated by the analog telecommunication device. Such DTMF signals are typically intended to represent a phone number of a remote telecommunication device to which the customer intends to establish a call. The telecommunication device generates a different DTMF signal for each different number pressed on the keypad of the device. However, telecommunication devices may also output DTMF signals stored in a memory of the device such as by activating a speed dialing feature of a phone. Also, telephony devices such as a security or alarm monitoring system may have circuits capable of generating preprogrammed DTMF signals for use with establishing a call to an alarm monitor service or other remote system.

The controller of the RDD is operative to intercept the DTMF signals before the signals are transmitted to the PSTN. The controller of the RDD monitors the intercepted DTMF signals to determine if a potential telephone number associated with the DTMF signals corresponds to a local or long distance call. For example, the DTMF signals may begin with a numeric prefix associated with a long distance call such as "1" or "011". An exemplary embodiment of the DTMF is operative to monitor DTMF signals associated with these numbers at the beginning of a stream of DTMF signals. If these long distance number indicating DTMF signals are not detected, then the controller is operative to transmit the received DTMF signals to the telephone line (POTS circuit) connected to the PSTN. The PSTN service of the customer may then attempt to establish the local call to the telecommunication device 32 associated with the DTMF signals.

If, however, the long distance number indicating DTMF signals (e.g. signals representing "1" or "011") are detected, then the controller is operative to store data representative of the received DTMF signals in a memory device 72 and in place of these signals, transmit alternative DTMF signals to the telephone line (POTS circuit) connected to the PSTN. The alternative DTMF signals correspond to one of the telephone numbers of the previously described VOIP service. Data representative of the VOIP service telephone number may be stored in the memory device 72 of the RDD.

Responsive to the alternative DTMF signals, the PSTN service of the customer may then attempt to establish the call (typically a local call or a toll free call) to the PSTN/VOIP gateway server 12 associated with the DTMF signals. Upon connecting with the PSTN/VOIP gateway server, the RDD is operative to transit the originally intercepted DTMF signals which correspond to the telephone number that the customer is attempting to make. In the exemplary embodiment, the PSTN/VOIP gateway server is operative to cause a telephone number corresponding to the DTMF signals transmitted from the RDD to be determined. The PSTN/VOIP gateway server is further operative to cause a telephone call to be established with a remote telecommunication device 50, 60 associated with the determined telephone number. As discussed previously, the telephone call established by the PSTN/VOIP gateway server includes communication of the call through an IP-based network such as the Internet or a private TCP/IP network. To facilitate this communication, the PSTN/VOIP gateway server converts the analog signals originating from the customer's telecommunication device into digital VOIP packetized data suitable for transmission across the Internet or a private network. Likewise, within the same telephone call, VOIP packetized data from the remote telecommunication device 50, 60 is converted by the PSTN/VOIP gateway server into an analog signal and transmitted through the PSTN connection to the customer's analog telecommunication device, thereby establishing two-way telecommunication.

As discussed previously, the described VOIP service is operative to charge customers using analog phones for the ability to route long distance calls through the VOIP service. This business model may be competitive with traditional long distance through a PSTN, because, the total cost of the local call to the VOIP service and the service charges for transmitting calls through he VOIP service are less than traditional long distance calls made through a long distance carrier.

In addition, by using an RDD, customers have automatic access to both less expense VOIP-based long distance calls and continued access to local calling services provided by their local telephone company such as 411, 611, 911, and 0 services. In addition, unlike VOIP client devices, an external AC power source is not needed (for VOIP devices, cable/DSL modems, gateway, firewalls, hubs etc.) to make VOIP calls through the described VOIP service. The RDD in an exemplary embodiment includes a controller that is capable of being powered through the current provided by the POTS circuit. If there is a power outage in which electrical service to the home or business is out, assuming the analog POTS circuits to the local telecommunication company are still working, the customer can continue to make long distance calls through the described VOIP service.

In an exemplary embodiment, the PSTN/VOIP gateway server is operative to track identifying information associated with calls made to the VOIP service. Such identifying information may correspond to the data representative of the caller telephone number (e.g. caller ID) included by the PSTN in the analog signal received by the PSTN/VOIP gateway server. In alternative exemplary embodiments, such identifying information may correspond to a customer specific number, provided by the RDD in the form of DTMF signals or other signals. Such a customer-specific number may correspond to an account number, password or a unique identification number(s) stored in the memory of the RDD.

The PSTN/VOIP gateway server is responsive to such identifying information to determine if the telephone line and/or RDD from which the call is originating is associated with a customer account that is permitted to use the VOIP service. In the exemplary embodiment the PSTN/VOIP gateway server may include or be in operative connection with a database 80 which stores such customer identifying information in association with account information for the customer of the VOIP service. The PSTN/VOIP gateway server may also be operative to store usage information in the data store for the calls made by each customer through the VOIP service. Such usage information may be used by computer systems of the VOIP service in generating and/or calculating billing information for each customer.

As discussed previously, in the exemplary embodiment, data associated with the alternative telephone number for the VOIP service is stored in the memory 72 of the RDD 30. The controller 70 of the RDD may be adapted to enable the telephone number of the VOIP service in the memory to be updated using DTMF signals representative of programming or configuration commands. The controller for example, may be responsive to DTMF signals representative of the non-numeric symbols of "*" or "#" alone or in combination with DTMF signals representative of numbers to go into a state or mode which enables features of the RDD to be configured using DTMF signals. Once in this mode, the controller may be adapted to respond to specific DTMF signals to update the VOIP service telephone number and or other operating features of the device.

In the exemplary embodiment, DTMF signals for configuring the RDD may be produced by the customer using the numeric keypad of an analog phone connected to the RDD. In other exemplary embodiments, the DTMF signals may originate from the PSTN/VOIP gateway server. For example, the VOIP service may wish to have customers use a new telephone number to access the PSTN/VOIP gateway server. Thus after the RDD connects to the VOIP service using the original VOIP service telephone number, the PSTN/VOIP gateway server may transmit a series of DTMF signals which are operative to configure the RDD to store the new VOIP service telephone number in the memory of the RDD. The DTMF signals may include DTMF signals which directly correspond to numbers representative of the new phone number. However, in alternative exemplary embodiments, the DTMF signals may include DTMF signals which correspond to an encrypted form of the new phone number. The RDD may be operative to decrypt the encrypted new phone number before storing it in the RDD and/or before using it to call the PSTN/VOIP gateway server.

In addition, to avoid confusing the customer by sending an unexplained series of DTMF signals that are audible through a phone, the PSTN/VOIP gateway server may be operative to transmit a voice recording or message to the analog communication device, which requests the user to remain patient while the RDD is being updated.

In further exemplary embodiments, the RDD may include other features which enhance the user experience of the described VOIP service. For example, in an alternative exemplary embodiment, rather than mounting the RDD between an analog telecommunication device and a telephone wall outlet and/or telephone line, the RDD may be adapted to mount a portion of the telephone circuit in a home or business which enables the RDD to monitor/intercept DTMF signals generated by any of the many analog telecommunication devices (phones, faxes) connected to the same circuit.

In addition, further exemplary embodiments of the RDD may include buttons, dials, levers or other input devices which cause the circuit of the RDD device to modify the analog signal so as to increase or decrease the volume outputted by the speaker of an analog phone. In addition, further exemplary embodiments of the RDD may include a circuit which is capable of performing voice recognition on the analog signals. The RDD may be responsive to voice commands detected in the analog signal to carry out various functions. Such functions may correspond to configuring and updating the RDD with a new VOIP service telephone number. Such functions activated by voice commands may also include functions for storing and retrieving speed dial numbers in/from the memory of the RDD.

In exemplary embodiments, the RDD and the PSTN/VOIP gateway server may be operative to encrypt/decrypt numbers sent via DTMF signals. For example, the previously described identifying data used to authenticate the user, may be encrypted by the RDD and decrypted by the PSTN/VOIP gateway server using symmetric and/or public key cryptography. Also, in alternative exemplary embodiments, the RDD and PSTN/VOIP gateway server may use other forms of analog signals to transmit identifying data, phone numbers, and other data therebetween. Further, in further exemplary embodiments, the PSTN/VOIP gateway server may be operative to encrypt/decrypt the voice communication transmitted through the analog telephone line.

In exemplary embodiments, DID numbers (e.g. telephone numbers) may be acquired from one or more telephone companies to connect analog phone lines from many different geographical areas and/or rate areas to one or more of the previously described PSTN/VOIP gateway servers. Exemplary embodiments may include methods of acquiring DID numbers for use with the described VOIP service.

For example, one exemplary method may include forming an organization or adapting an existing organization to have competitive local exchange carrier (CLEC) status. Such an organization is referred to herein as a CLEC and in general corresponds to a telephone company with facilities in multiple regions. This described method may further include having the CLEC acquire blocks of numbers from the North American Numbering Plan Administration (NANPA). Once the CLEC has control of the numbers, the method may include the CLEC contracting with a plurality of local exchange carriers (LECs) to have the telephone numbers in different geographical regions routed to the CLEC. The contracting with the LECs includes the CLEC acquiring large trunks, to pass traffic in/out of the CLEC's network. The method may then include the CLEC using these numbers to connect analog calls to the previously described VOIP service.

In an alternative exemplary embodiment, rather than forming a CLEC to provide the previously described VOIP services, the method may include forming an organization or adapting an existing organization to provide VOIP services by acquiring or adapting network facilities (e.g. T1, T3, DS3) from a carrier such as an existing CLEC or a LEC. Such an organization may acquire telephone numbers from the carrier who provides the network facilities. This alternative method may include the organization contracting with the carrier to acquire available telephone numbers from the carrier's current pool of numbers.

The method used will depend on the resources available to the organization being formed to provide the described VOIP services. For example, the CLEC corresponds to a regional business operating in a group of geographically adjacent rate centers. A CLEC must have sufficient resources to acquire blocks of numbers for that territory and then find LEC's to land/route the traffic. In contrast, an organization that does not have sufficient resources to acquire CLEC status may instead contract with one or more CLECs or LECs for telephone numbers.

To maximize market reach, both approaches would likely prefer to have all rate centers covered everywhere in North America. However, for an organization that does not have CLEC status, it may be cost prohibitive to install facilities in each rate center. Therefore for such an organization, the method may include partnering with a national carrier that already has a significant networks. Examples of such national carriers may include Level3, XO, and ATT/SBC. In some cases, the national carrier may even operate media gateways and other higher level facilities on behalf of the organization providing the described VOIP service. For example, the described PSTN/VOIP gateway servers may be operated by a national carrier and the authentication of the users may be carried out through communication between the PSTN/VOIP gateway servers and remote authentication servers operated by the organization marketing the VOIP services.

It is too be understood that the above described methods for forming organizations and acquiring DID numbers for use with the previously described VOIP service, are only examples of some of the many embodiments that may be carried out. In alternative exemplary embodiments, the described gateways, routers, DID numbers, IP networks, VOIP proxy servers, authentication servers, and other described elements may be organized in different configurations and/or controlled by one or more different entities depending on the network facilities used and the contractual arrangements that may be made by the different entities involved.

Computer software instructions used in operating the PSTN/VOIP gateway server and other computer systems of the described VOIP service may be loaded from computer-readable media or articles of various types into the respective computers. Such computer software may be included on and loaded from one or more articles such as diskettes, compact disks, DVDs and other optical or magnetic media. Such software may also be included on articles such as hard disk drives, tapes, flash memory drives or other storage devices. Other articles which include data representative of the instructions for operating computers in the manner described herein are suitable for use in achieving operation of automated banking machines and systems in accordance with exemplary embodiments.

Thus the VOIP service and systems described herein achieves one or more of the above stated objectives, eliminates difficulties encountered in the use of prior devices and systems, solves problems and attains the desirable results described herein.

In the foregoing description, certain terms have been used for brevity, clarity and understanding; however, no unnecessary limitations are to be implied therefrom, because such terms are used for descriptive purposes and are intended to be broadly construed. Moreover, the descriptions and illustrations herein are by way of examples, and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof. The description of the exemplary embodiment included in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

I claim:

1. An apparatus comprising:
 a redirecting component that is at least one of included in a local phone, in operative connection with a local phone, or a combination thereof, wherein the local phone is operative to receive an input of a phone number from a user;
  wherein the redirecting component is operative to determine whether the inputted phone number corresponds to a local phone number or a long distance phone number,
  wherein responsive at least in part to a determination that the inputted phone number corresponds to a local phone number, the redirecting component is operative to cause the local phone to connect to a remote phone associated with the local phone number,
  wherein responsive at least in part to a determination that the inputted phone number corresponds to a long distance phone number, the redirecting component is operative to cause the local phone to connect to at least one service associated with an alternative number stored in a memory of the redirecting component, wherein the redirecting component is operative to cause the long distance phone number to be communicated to the at least one service, wherein the at least one service is operative to establish voice communications over at least one IP network between the local phone and a remote phone associated with the long distance number, wherein the redirecting component is operative to update the memory of the redirecting component to include a different alternative number responsive at least in part to communications received from the at least one service, wherein responsive at least in part to a determination by the redirecting component that a subsequently inputted phone number inputted into the local phone corresponds to a long distance phone number, the redirecting component is operative to cause the local phone to connect to at least one service associated with the different alternative number stored in the memory of the redirecting component in order to cause voice communications to be established between the local phone and a remote phone associated with the subsequently inputted phone number.

2. The apparatus according to claim 1, further comprising the local phone.

3. The apparatus according to claim 2, where the local phone includes the redirecting component.

4. The apparatus according to claim 1, wherein the at least one service includes at least one server, and further comprising the at least one server.

5. The apparatus according to claim 4, wherein the at least one service is operative to use direct inbound dialing (DID) to establish two way voice communications between the local phone and a remote phone.

6. The apparatus according to claim 5, wherein the alternative number and the different alternative number correspond to direct inbound dialing (DID) numbers with which the at least one server is operative to use to establish communications between the local phone and a remote phone.

7. The apparatus according to claim 4, wherein the at least one server is operative to establish the voice communications over the at least one IP network using voice over Internet protocol (VoIP).

8. The apparatus according to claim 4, wherein the at least one server is operative to establish the voice communications over the at least one IP network using session initiation protocol (SIP).

9. The apparatus according to claim 1, wherein the redirecting component is operative to update the memory of the redirecting component to include the different alternative number responsive at least in part to dual tone multi-frequency (DTMF) signals received from the at least one service.

10. The apparatus according to claim 1, further comprising the at least one service, wherein the at least one service is operative to generate packetized data representative of voice communications received via the local phone.

11. The apparatus according to claim 10, wherein the at least one service is operative to enable the local phone to receive voice communications corresponding to packetized data received through the at least one IP network.

* * * * *